United States Patent [19]

Tsuyuguchi et al.

[11] Patent Number: 5,293,601

[45] Date of Patent: Mar. 8, 1994

[54] FLOPPY DISK CONTROL UNIT AND APPARATUS HAVING A FLOPPY DISK CONTROL UNIT

[75] Inventors: Hiroshi Tsuyuguchi, Tokyo; Shinichiro Tanaka, Saitama; Fumio Nagase, Tama; Naoki Sugeta, Fuchu; Miya Enami, Higashikurume; Tohru Miura, Mitaka; Katsuya Enami, Higashikurume, all of Japan

[73] Assignee: Teac Corporation, Tokyo, Japan

[21] Appl. No.: 633,665

[22] Filed: Dec. 26, 1990

[30] Foreign Application Priority Data

Dec. 27, 1989 [JP] Japan .................. 1-150426[U]
Jul. 13, 1990 [JP] Japan .................. 2-185566
Jul. 13, 1990 [JP] Japan .................. 2-185567

[51] Int. Cl.⁵ .......................................... G06F 13/00
[52] U.S. Cl. ............................... 395/425; 364/DIG. 1; 364/236.2; 364/239
[58] Field of Search ........................... 395/400, 425

[56] References Cited

U.S. PATENT DOCUMENTS

4,885,482 12/1989 Sharp et al. ........................ 364/200
5,075,841 12/1991 Kaneko ......................... 364/DIG. 1

FOREIGN PATENT DOCUMENTS

0296022 12/1988 European Pat. Off. ............ 395/425

Primary Examiner—David L. Robertson
Attorney, Agent, or Firm—Michael N. Meller

[57] ABSTRACT

A floppy disk drive controller has a control part which performs a plurality of kinds of controls by means of outputting control information appropriate to each kind of control, and a memory part in which information which selects a predetermined kind of control from among the plurality of kinds of controls is pre-stored, the control part outputting the control information corresponding to the predetermined kind of control which is selected based on the information from the memory part.

12 Claims, 6 Drawing Sheets

FLOPPY DISK CONTROL UNIT AND APPARATUS HAVING A FLOPPY DISK CONTROL UNIT

BACKGROUND OF THE INVENTION

The present invention relates generally to Floppy Disk Drive Control Units, and more particularly to a control information unit which performs a plurality of kinds of controls by means of outputting control information appropriate to each kind of control of the floppy disk drive.

In a floppy disk drive (called FDD for short), the following functions which the FDD is to be equipped are occasionally changed depending upon the needs of customers, such as the presence of a READY signal which indicates a predetermined part thereof is in a ready state for the operation of the floppy disk drive, the data output level, the presence of a calibration signal which is an initial movement of a head to a predetermined track on a disk, the lighting state of the front light emitting diode (called LED for short).

As shown in FIG. 1, the principal part of the conventional control information output unit is a large scale integrated circuit (called LSI for short) so that the LSI is equipped with various control functions. LSI 9 has selecting terminals 10 which are to be connected to jumper lines (or strap pins) 11. And predetermined kinds of controls are selected by means of switching the connection between each of the selecting terminals 10 and each of the jumper line 11. However, since there are numerous kinds of controls to be selected, if the number of selecting terminals are increased, a printed circuit board (called PCB for short) on which the LSI is mounted has to become larger. Additionally, the number of the selecting terminals cannot be increased beyond a certain limit. Accordingly, all the controls are divided so as to be distributed to several LSIs. However, the conventional control information output unit has the following disadvantages:

1. It is troublesome to connect each jumper line (or strap pin) to each selecting terminal;
2. If the number of selecting terminals are increased, the PCB has to become larger, and then, in turn, the FDD has also to become larger;
3. If the required functions are distributed to the several LSIs, the number of different kinds of LSIs and PCBs are increased so that the number of manufacturing processes are increased accordingly and thus the cost of the FDD becomes higher.

SUMMARY OF THE INVENTION

Accordingly, it is a general object of the present invention to provide a novel and useful floppy disk control device and a novel and useful apparatus having such control information output in which the above disadvantages are eliminated.

Another object of the present invention is to provide control information output and an apparatus having such a control information which is smaller, more inexpensive and more easily fabricated than the conventional ones.

Another specific object of the present invention is to provide control information which comprises control means for performing a plurality of kinds of controls by means of outputting control information appropriate to each kind of control, and a memory, coupled to the control means, in which selecting information which selects a predetermined kind of control from among the plurality of kinds of controls is pre-stored, the control means outputting the control information corresponding to the predetermined kind of control which is selected based on the selecting information from the memory.

Another object of the present invention is to provide an apparatus having a control means for performing a plurality of kinds of controls by means of outputting control information appropriate to each kind of control, and a memory, coupled to the control means, in which information which selects a predetermined kind of control from among the plurality of kinds of controls is pre-stored, the control means outputting the control information corresponding to the predetermined kind of control which is selected based on the selecting information from the memory, and a plurality of controlled objects corresponding to the plurality of kinds of controls, the controlled objects being to the control means and controlled by the control means.

In the floppy disk drive control unit according to the present invention, the predetermined kinds of controls corresponding to the control information which is to be outputted by the control means are selected by means of the selecting information stored in the memory. Therefore, the control means can output the predetermined control information only by being connected to the memory containing the information.

Other objects and further features of the present invention will be apparent from the following detailed description when read in conjunction with the accompanying drawings.

DESCRIPTION OF THE PREFERRED EMBODIMENTS

Figure 1:
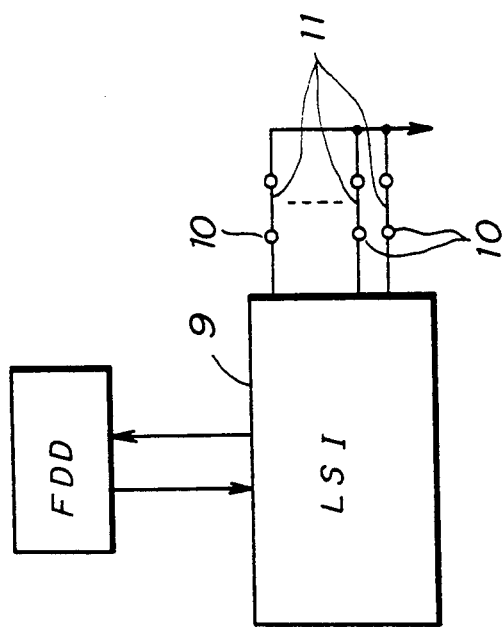
FIG. 1 is a block diagram of a floppy disk control unit.
Figure 2:
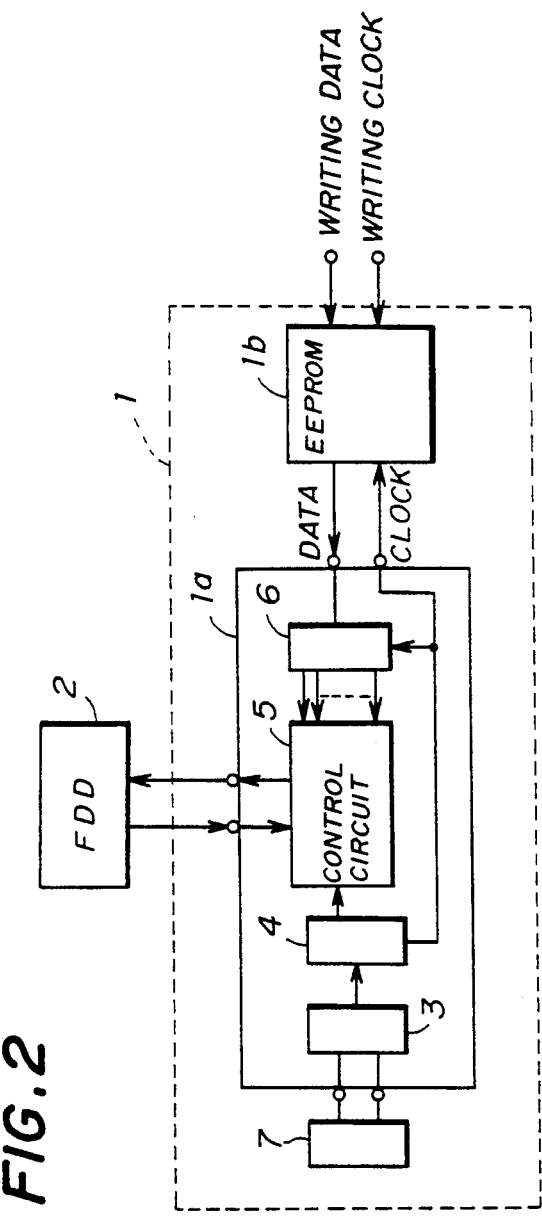
FIG. 2 is a block diagram of a floppy disk control unit of a first embodiment according to the present invention.

FIG. 2 shows a floppy disk drive control unit 1 of the first embodiment according to the present invention and a FDD 2 which is a controlled apparatus. The control information output unit 1 comprises a LSI 1a, an electrically erasable programmable read only memory (called EEPROM for short) 1b, and an oscillator element 7. The LSI 1a performs a plurality of kinds of controls to the FDD 2 by means of outputting the control information appropriate to each kind of control. Selecting information is pre-stored in the EEPROM 1b so that predetermined kinds of controls are selected from among the plurality of kinds of controls by means of the selecting information. The oscillator element 7 controls the operating of the LSI 1a and EEPROM 1b. The LSI 1a and the EEPROM 1B are mounted on the PCB (not shown) so as to be connected with each other. The LSI 1a comprises an oscillator circuit 3, a divider 4, 5 a control circuit 5, and a serial/parallel converter 6. Therefore, the LSI 1a does not have a calculating function. The oscillator element 7 is connected to the oscillator circuit 3. The oscillator circuit 3 outputs an oscillatory signal to the divider 4 so as to generate a clock signal. The clock signal is supplied to the control circuit 5, the serial/parallel converter 6, and the EEPROM 1b. The floppy disk drive control unit 1 operates in synchronization with the clock signal.

A description will now be given of the operation of the floppy disk drive control unit 1. Firstly, when the power is supplied, the clock signal is transmitted from the LSI 1a to the EEPROM 1b. The EEPROM 1b outputs serial selecting information in synchronization with the clock signal to the LSI 1a. The control circuit 5 of the LSI 1a selects predetermined kinds of controls of the FDD 2 based on the selecting information. Therefore, the predetermined kinds of controls can be selected as long as the LSI 1a is connected only with the EEPROM 1b even when a multiplicity of jumper lines (or strap pins) as before are not provided. The serial selecting information from the EEPROM 1b are converted to parallel selecting information by the serial/parallel converter 6 so as to be supplied to the control circuit 5. Therefore, the predetermined kinds of controls can be selected by means of transmitting of the information. The predetermined kinds of controls are not selected before the power is supplied, and they are selected based on the clock signal which is generated when the power is supplied.

The selecting information stored in the EEPROM 1b can be read and/or written by an external computer. Therefore, the external computer can administrate the selecting information to be stored in the EEPROM 1b for every version of the FDD. In this embodiment, the data are written and/or rewritten by means of writing data and writing clock.

As mentioned above, since the predetermined kinds of controls of the LSI 1a are selected by the EEPROM 1b, the process of connecting the LSI 1a to a multiplicity of jumper lines can be omitted. Moreover, the PCB can be miniaturized. Additionally, the LSI 1a can be equipped with all required kinds of control functions and the EEPROM 1b selects the predetermined kinds of controls so that just one kind of LSI may be used for every version of a FDD. Therefore, it is not necessary to prepare several LSIs so that manufacturing costs become lower. Besides, the external computer can conveniently administrate the every version of FDD on a program thereof.

Figure 3:
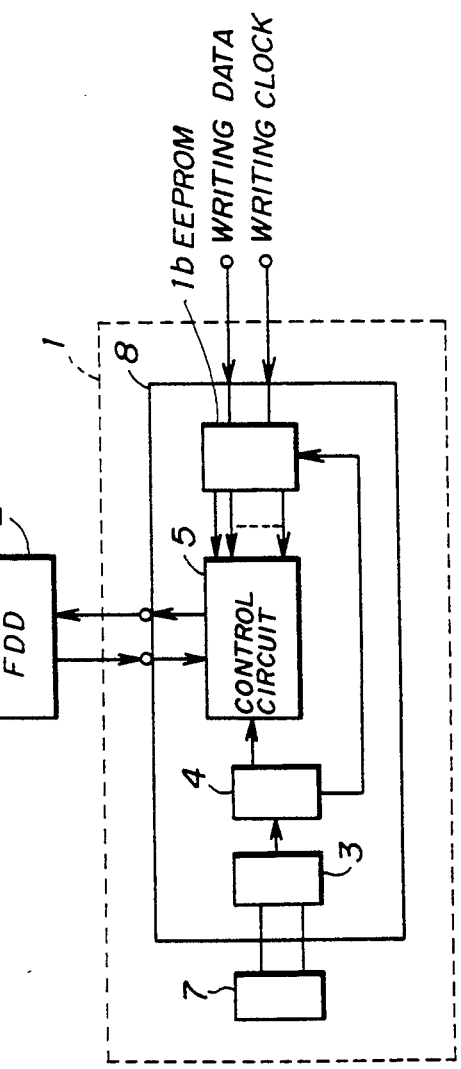
FIG. 3 is a block diagram of a floppy disk control unit of a second embodiment according to the present invention.

The LSI 1a is separated from the EEPROM 1b in FIG. 2, however, the EEPROM 1b may be included in an LSI 8 as shown in FIG. 3. The EEPROM 1b according to the embodiments can output the selecting information in parallel. Therefore, the area of the floppy disk drive control unit mounted on the PCB is smaller, and the serial/parallel converter can be omitted.

Incidentally, a ROM which is inserted into a socket, may be used instead of an EEPROM.

Figure 4:
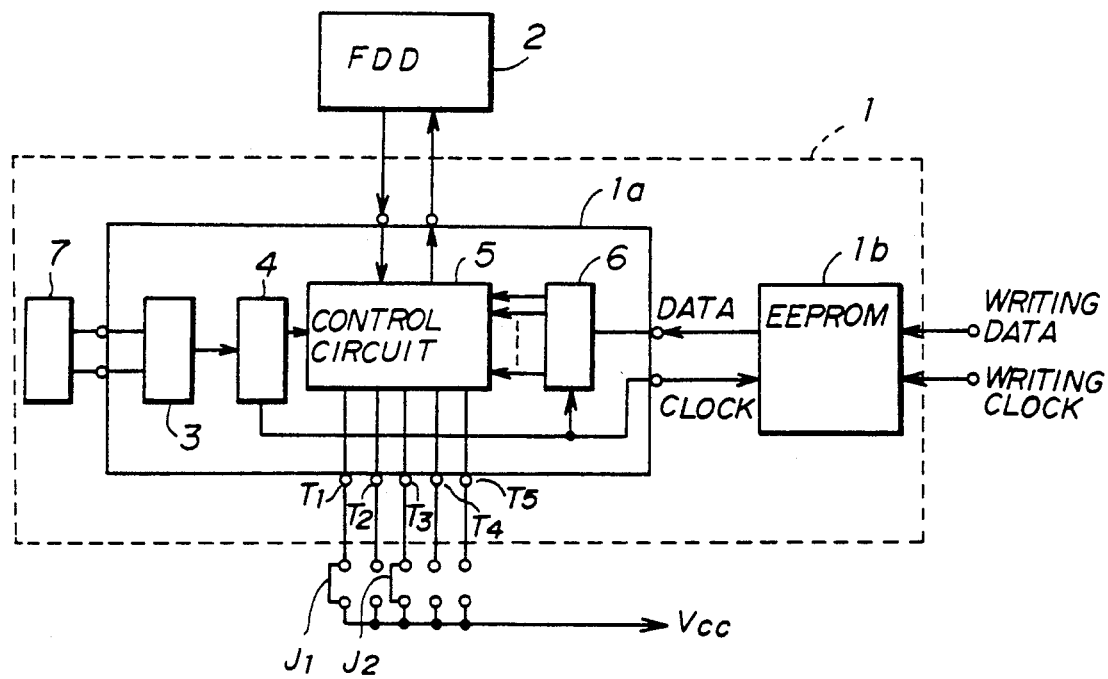
FIG. 4 is a block diagram of a floppy disk control unit of a third embodiment according to the present invention.

FIG. 4 is a block diagram of a floppy disk drive control unit of a third embodiment according to the present invention. These elements which are the same as corresponding elements in FIG. 2 are designated by the same reference numerals, and a description thereof will be omitted. In this embodiment, the predetermined kinds of controls of the LSI 1a are selected by the EEPROM 1b as a whole, and selected individually by the jumper lines. Therefore, the LSI 1a is connected to the EEPROM 1b, and has the selecting terminals. For example, selecting terminals $T_1$ and $T_3$ from among selecting terminals $T_1$ to $T_5$ are connected to a current supply source $V_{cc}$ via jumper lines $J_1$ and $J_3$ so that kinds of controls corresponding to $T_1$ and $T_3$ are selected. Stop pins may be used instead of the jumper lines. For example, some kinds of controls which are to be changed in accordance with the desires of customers are selected by EEPROM 1b, whereas some kinds of controls which are not to be changed are selected by the jumper lines. Accordingly, the predetermined kinds of controls to be selected can be easily changed in accordance with the needs of the customers.

Figure 5:
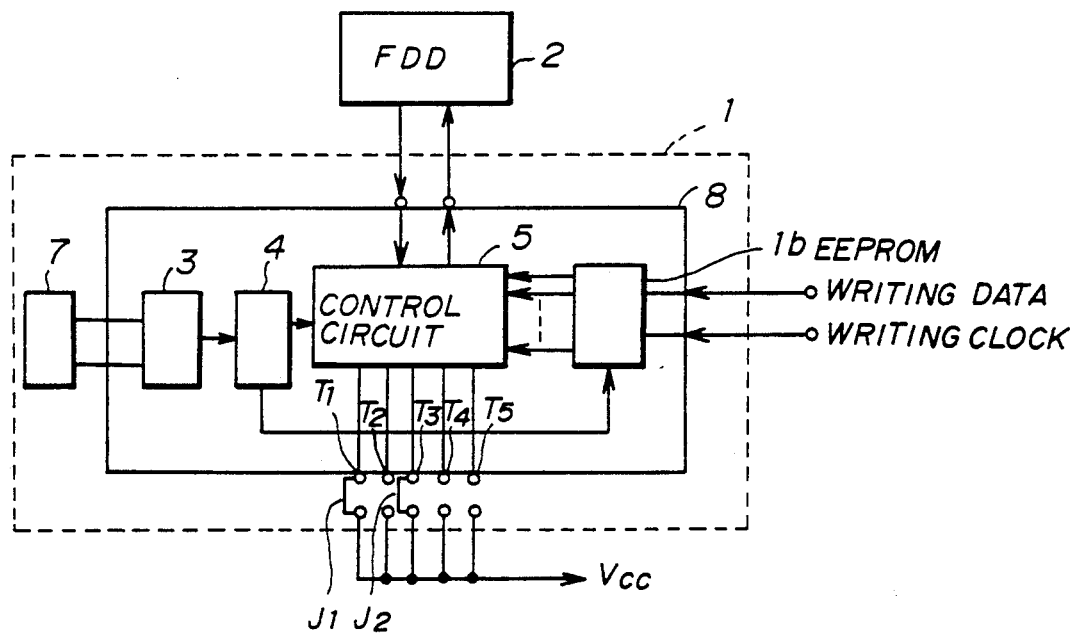
FIG. 5 is a block diagram of a floppy disk control unit of a fourth embodiment according to the present invention.

FIG. 5 shows a floppy disk drive control unit corresponding to the floppy disk drive control unit in FIG.3 applied to jumper lines in FIG.4 so that it has the advantages of both floppy disk drive control units in FIGS. 3 and 4.

The LSI 1a may further control [the establishment of] a filter constant in the signal processing system, and versions of a particular FDD.

The floppy disk drive control unit 1 may be attached to the FDD 2. In this case, it is conceivable to provide extra terminals which are used for reading and writing the selecting information of EEPROM besides the standard interface with which the FDD is usually equipped. However, providing leased terminals for the FDD increases the number of the terminals so that the miniaturization of the FDD and costs cannot be kept low. In addition, there is a possibility of that a connection error may occur. Accordingly, the present invention also provides an example of an FDD in which the above problems are eliminated.

Figure 7:
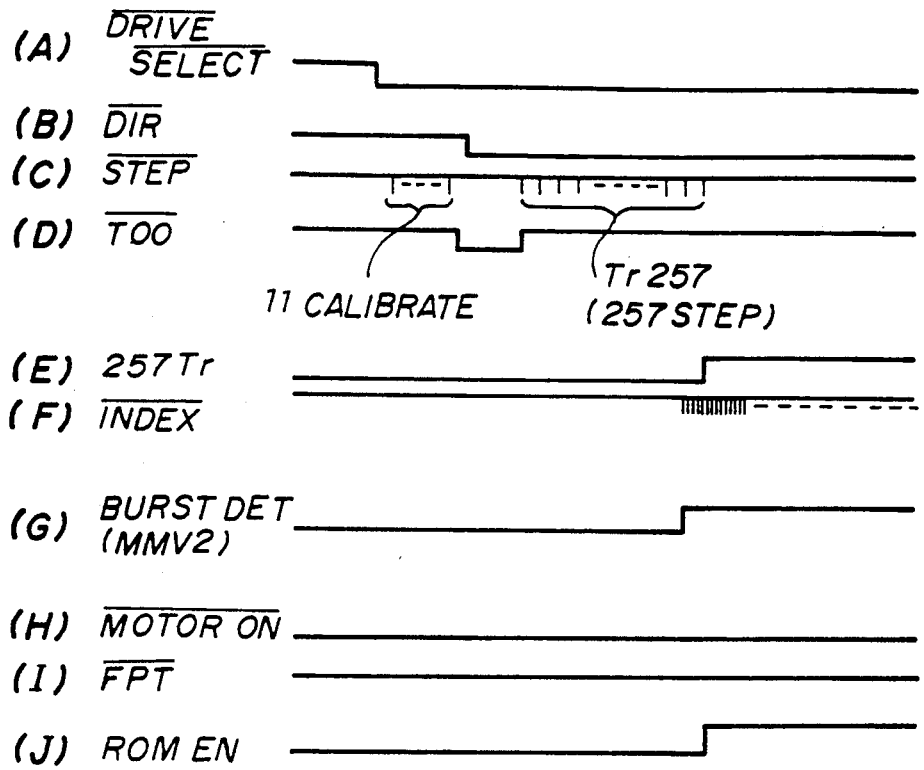
FIGS. 7 and 8 are respectively waveform views showing operations of the FDD in FIG. 6.
Figure 8:
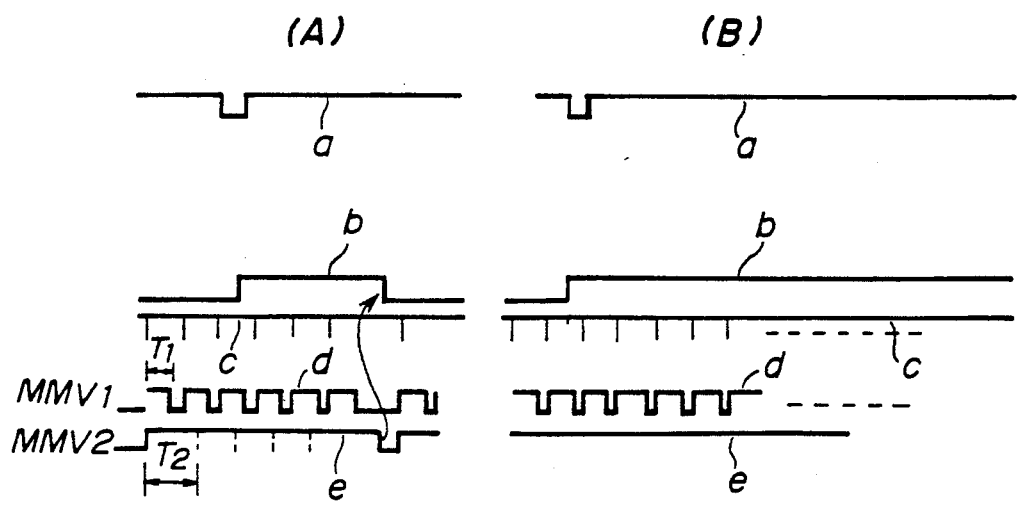

A description will be given of FDD according to the present invention with reference to FIGS. 6 to 8. The selecting information is written and/or read by an external computer to an EEPROM 21 via an interface 23. Hereupon, the FDD comprises protection means comprising a plurality of circuits which is connected to the EEPROM 21 and the interface 23. The protection means protects the EEPROM 20 so as to usually prevent the EEPROM 21 from being accessed by external apparatuses, however, it authorizes the external apparatuses to access to the EEPROM 21 only when predetermined information is transmitted from the external apparatuses.

The EEPROM 21 outputs the selecting information to a controller 22. The controller 22 comprises a read/write (called R/W for short) control circuit 22a and a spindle motor control circuit 22b. Both circuits are controlled based on the selecting information from the EEPROM 21. Control signals from an interface 23 via logic circuits are further supplied to the controller 22. The controller 22 controls in accordance with such control signals the rotation of the spindle motor which rotates the floppy disk 24, and controls a R/W circuit 27. Incidentally, output terminals of the spindle motor control circuit 22b and a disk-in sensor which detects the presence of the disk 24 are connected to an input terminal of an AND gate 62, and the output of the AND gate is supplied to the spindle motor 25. The spindle motor control circuit 22b may have an auto-checking function which automatically chucks the inserted disk 24. Data which are to be supplied to a magnetic head 26 are transmitted from the controller 22 to the R/W circuit 27. The R/W circuit 27 is connected to the interface 23 via the logic circuits.

The interface 23 comprises a drive selecting (called DS for short) signal input terminal $T_1$, a STEP signal input terminal $T_2$, a direction (called DIR for short) signal input terminal $T_3$, INDEX signal input terminal $T_5$, data (called RD for short) output terminal $T_6$, a write gate (called WG for short) signal input terminal $T_7$, a Motor-On signal input terminal $T_8$, a write down (called WD for short) input terminal $T_9$, a SIDE 1 signal input terminal $T_{10}$ and a track 00 input terminal $T_{11}$.

Protection means comprises AND gates 39, 40, 46 to 49, and 51, retriggerable monostable multivibrators (called MMVs for short) 41 and 42, a flip flop 50, a code detector 52, serial/parallel converter 53, and parallel/serial converter 54.

The DS signal input terminal $T_1$ is connected to the input terminals of the AND gates 28 to 31, and NAND gates 32 and 33, respectively. STEP signal input terminal $T_2$ is connected to another input terminal of the AND gate 28 via an inverter 34. DIR signal input terminal $T_3$ is connected to another input terminal of the AND gate 29 via an inverter 35. The output terminals of the AND gates 28 and 29 are connected to a counter 36 and a stepping motor control circuit 37. The stepping motor control circuit 37 controls a stepping motor 55 in accordance with the signal from the AND gate 28.

The counter 36 counts by means of adding or subtracting the input signal from the AND gate 28 based on the input signal level from the AND gate 29 so as to supply the count value to a track decoder 38. The output of the AND gate 29 indicates a direction in which the tracks are counted.

The track decoder 38 supplies a signal appropriate to the count value of the counter 36 to the R/W circuit 27. The track decoder 38 supplies a detecting signal to the stepping motor control circuit 37 when it detects that the count value has become 82. In addition, when it detects that the count value has become 257, it supplies a detecting signal to the input terminals of the AND gates 39 and 40. Incidentally, the count value is not limited to 257, and another value may be appointed as long as it is not usually used for the value of the track.

Another input terminal of the AND gate 39 is connected to the INDEX signal output terminal $T_4$ via the MMVs 41 and 42, and the output terminal thereof is connected to a preset terminal of the counter 36. The counter 36 presets the count value to the track 82 in accordance with the output signal of the AND gate 39.

The INDEX signal output terminal $T_4$ is connected to the input terminal of the MMV 41 and the output terminal of the NAND gate 32. An input terminal of the NAND gate 32 is connected to the DS signal input terminal $T_1$ and an output terminal of an index sensor 43. The index sensor 43 detects an index hole of the disk 24 so as to output the detecting signal to the NAND gate 32. The output signal of the index sensor 43 is detected from the INDEX signal output terminal $T_4$ based on the level of the DS signal input terminal $T_1$.

The output terminal of the MMV 41 is connected to the MMV 42, and the output terminal of the MMV 42 is connected to the AND gate 39.

The FPT signal input terminal $T_5$ is connected to the output of the NAND gate 33, and one input terminal of the NAND gate 33 is connected to the DS input terminal $T_1$ and another input thereof is connected to the output terminal of a file protection sensor 44. The file protection sensor 44 is a sensor for detecting whether the information can be written on the disk 24. The output of the file protection sensor 44 is outputted from the FPT signal input terminal $T_5$ based on the input signal level from the DS signal input terminal $T_1$. The output of the file protection sensor 44 is supplied to another input terminal of the AND gate 40 via the inverter 45. The output of the AND gate 40 is supplied to the respective input terminals of the AND gates 46 to 49 and a reset terminal of the flip flop 50.

The output of the AND gate 47 and the flip flop 50 is supplied to the AND gate 51. The input terminal of the AND gate 40 is connected to the output terminal of the AND gate 48 and the WD signal input terminal $T_9$ via the inverter 57. The output terminal of the AND gate 48 is connected to a data input terminal of the serial/parallel converter 53. Another input terminal of the AND gate 49 is connected to the SIDE 1 signal input terminal $T_{10}$ via the inverter 58. When the preventing of the protection means is stopped, the clock signal is inputted to the SIDE 1 signal input terminal $T_{10}$. The output terminal of the AND gate 49 is connected to clock signal input terminals of the serial/parallel converter 53 and parallel/serial converter 54.

Data from the parallel/serial converter 54 are supplied to another input terminal of the AND gate 46. The output terminal of the AND gate 46 is connected to another input terminal of the NOR gate 56, and the output terminal of the NAND gate 56 is connected to the RD output terminal $T_6$. Accordingly, the data of the EEPROM 21 can be read via the RD output terminal $T_6$.

The WG signal input terminal $T_7$ is connected to the respective input terminals of the AND gate 51 and 31 via the inverter 59. The Motor-On terminal $T_8$ is connected to the input terminals of the controller 22 and the AND gate 47 via an inverter 60. The output terminal of the AND gate 47 is connected to the input terminal of the AND gate 51 and a load terminal of the parallel/serial converter 54.

The output of the serial/parallel converter 53 is supplied to an address input terminal and a data input terminal of the EEPROM 21, and a code detector 52. The code detector 52 outputs a high level signal when a predetermined code is inputted to the code detector 52. The WF signal from the serial/parallel converter 53 is supplied to the AND gate 51 and the code detector 52. The output of the AND gate 51 is supplied to a terminal of the EEPROM 21, which authorizes the writing thereto. Therefore, the EEPROM 21 can be written to when the input and output signals of the AND gate 51 become high level signals.

The data are written to the EEPROM 21 by way of the standard interface of the FDD (called FDD IF) without using extra terminals. Therefore, the protection means is connected to the FDD IF. When an attempt is made to connect the EEPROM 21 to the external apparatus via the FDD IF, data which are not usually used for the FDD are supplied to the FDD IF.

The track 00 input terminal $T_{11}$ is connected to the output terminal of the stepping motor control circuit 37 to which an output of a track 00 sensor 63 is supplied. The track 00 sensor 63 detects a most-outer track (the 00 track).

A description will now be given of controlling the protection means. Firstly, pulse signals are supplied to the STEP signal input terminal $T_2$ so as to appoint the track 257. Accordingly, the output signals of the track decoder 38 becomes high level signals in accordance with the track 257, as shown in FIG. 7(E). The track 257 is an imaginary track which is not used for the usual operation of the FDD partially preventing the EEPROM 21 from being accessed.

A burst signal having a predetermined frequency is connected to the INDEX signal output terminal $T_4$, as shown in FIG. 7(F). A signal having a frequency which is not usually used for the FDD is inputted to the INDEX signal output terminal $T_4$, which is originally an output terminal, while the DS signal input terminal $T_1$ and the DIR signal input terminal $T_3$ are at a low level, as shown in FIGS. 7(A) and (B).

The cascade stage of MMV 41 and that of 42 are provided to remove the accidental oscillation. As shown in FIGS. 8(A) and (B), the accidental oscillation seldom occurs continuously so it can be discriminated from the access signal by the breaking of the pulse.

In addition, writable disk must be inserted so it can be detected by the file protection sensor 44. Since the writable disk is seldom inserted during the usual operation of the FDD, the protect means authorizes the EEPROM 21 to be accessed.

Thus, the EEPROM 21 can be accessed so that an EN signal from the EEPROM 21 becomes a high level signal.

A description will now be given of the reading the selecting information of the EEPROM 21. Firstly, the clock signal is inputted from the SIDE 1 signal input terminal $T_{10}$. Next, addresses of the selecting information of the EEPROM 21 are designated via WD input terminal $T_9$. Consequently, the selecting information of the EEPROM 21 are outputted via the RD. output terminal $T_6$ from which the reading data are outputted.

A description will now be given of the writing of the selecting information to the EEPROM 21. Firstly, the clock signal is inputted to the SIDE 1 signal input terminal $T_{10}$ so that the WG signal input terminal $T_7$ and the Motor-On signal input terminal $T_8$ become at high levels. Next, the selecting information corresponding to the data which are predetermined by the code detector 52 is inputted to the WD input terminal $T_9$. The selecting information including address data is inputted to the WD input terminal $T_9$. Consequently, the selecting information can be written to the EEPROM 21.

As mentioned above, since the selecting information of the EEPROM can be written and/or read by means of the standard interface equipped with the FDD, there is no need to provide leased terminals for the EEPROM. Therefore, the FDD can be miniaturized and manufacturing costs can be kept low. Moreover, since the protection means comprises a plurality of circuits, the destruction of the data by a misconnection can be prevented. Incidentally, the selecting information stored in the EEPROM is not limited to operational versions of the FDD. And the application of the present invention is not limited, needless to say, to the FDD.

Figure 6:
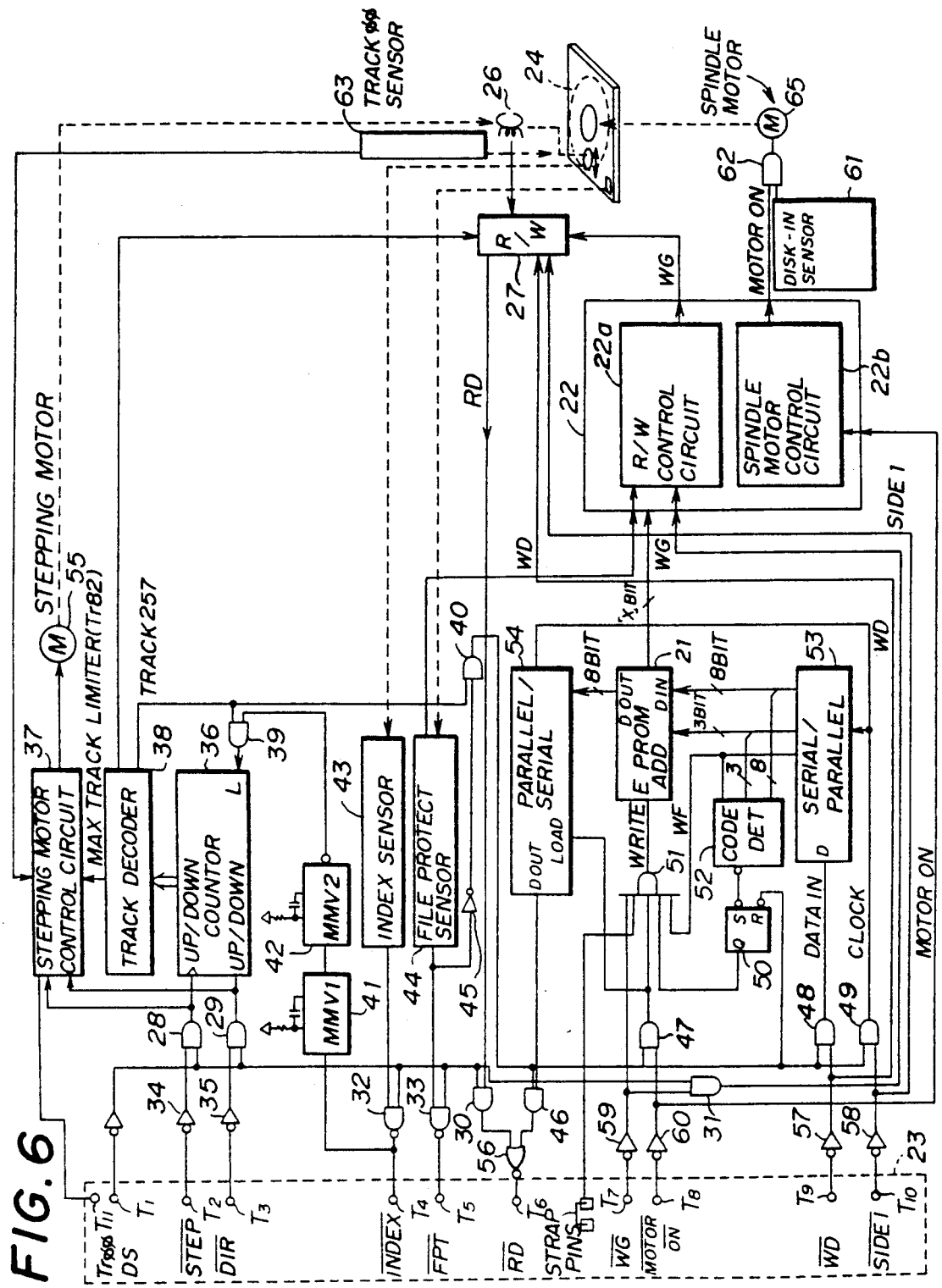
FIG. 6 is a block diagram of a FDD according to the present invention.
Figure 9:
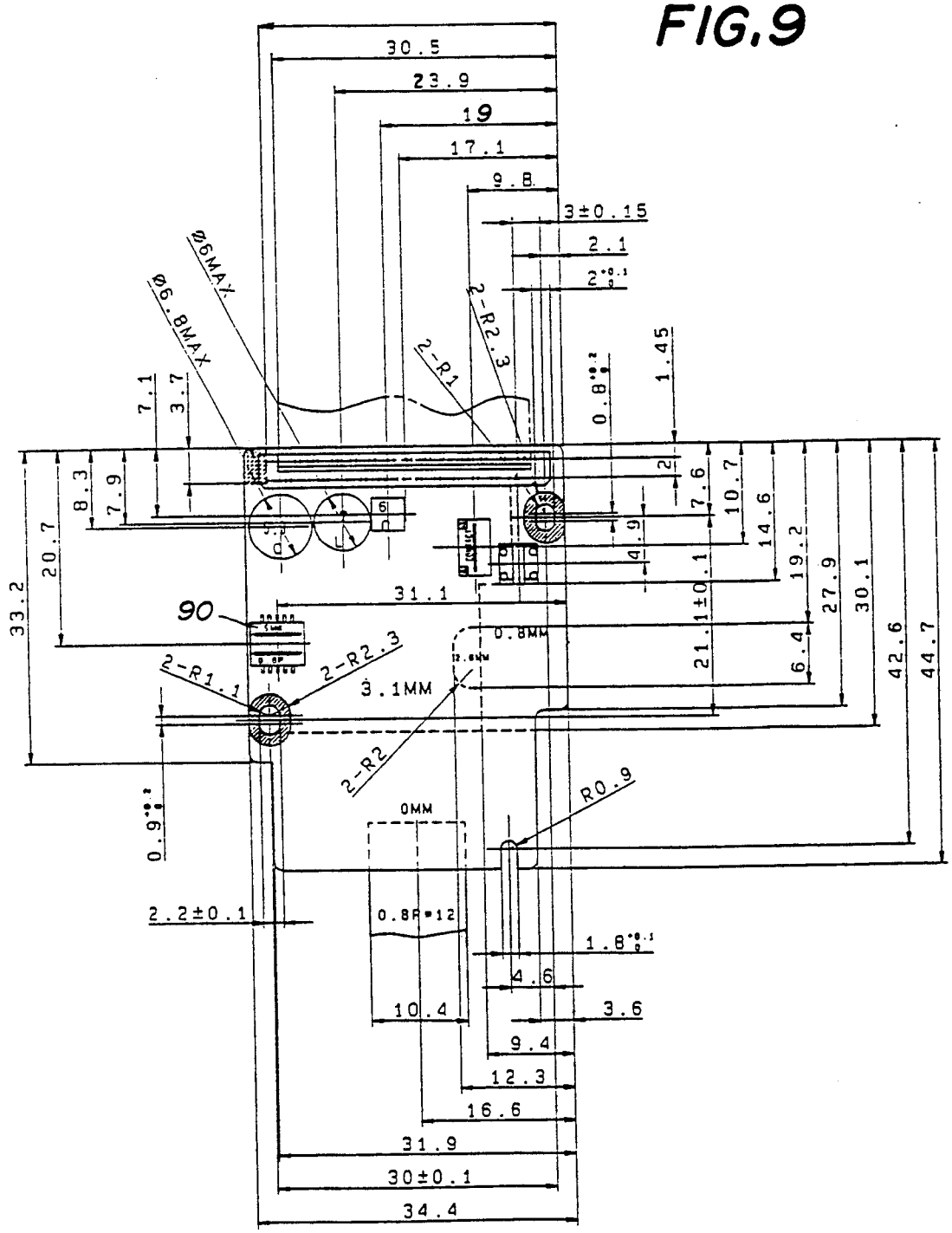
FIG. 9 is a plane view of a control substrate according to the present invention.

Most of elements of the FDD except the spindle motor 25, magnetic head 26, stepping motor 55, sensors 43, 44, and 61 or the like shown in FIG.6 are integrated into a plurality of LSIs, and mounted on a control substrate. Hereupon, the controller 22 and the stepping motor control circuit 37 without a stepping motor driver which drives the stepping motor 55 are integrated into one LSI, which is called a FDD mechanical controller. Therefore, the control substrate functions as the FDD mechanical controller. And, for example, the FDD mechanical controller and the R/W circuit 27 can be combined into one LSI to prevent the control substrate from being too large because of a plurality of LSIs. However, there has not been developed one LSI in which the EEPROM 21, FDD mechanical controller, R/W circuit 27, and stepping motor driver are integrated and combined, which makes the control substrate too large. Accordingly, the present invention combined them into one LSI, and mounted on the control substrate. FIG.9 shows the control substrate on which the LSI is mounted. The LSI 90 includes a function of the EEPROM 21, controller 22, R/W circuit 27, and stepping motor 37 shown in FIG. 6. The strap pins for the EEPROM 22 are removed so that the scale of the control substrate is 44.7*34.4 mm, which is enough small.

Further, the present invention is not limited to these preferred embodiments, but various variations and modifications may be made without departing from the scope of the present invention.

What is claimed is:

1. An apparatus for controlling functions of a disk drive, said apparatus comprising:
   control means for outputting control information appropriate to each of a plurality of kinds of controls;
   a memory, coupled to the control means, for storing information used to select predetermined kinds of controls from among the plurality of kinds of controls, the control means outputting the control information corresponding to the predetermined kinds of controls which are selected based on the selecting information from the memory;
   a plurality of controlled objects corresponding to the plurality of kinds of controls, said controlled objects being coupled to the control means and controlled by the control means;
   a connection member connected to an external computer, first information from the external computer being transmitted to said memory via said connection member, and the information stored in said memory being read by the external computer via said connection member, said first information including at least information used to control operations of said controlled objects, and including the information used to select predetermined kinds of controls: and
   protection means coupled to said connection member and said memory, for authorizing the information by the external computer to the memory and/or the reading of the information by the external computer only when predetermined information is supplied from the external computer to said connection member,
   wherein said protection means does not authorize the writing of the information to the memory and/or the reading of the information from the memory unless the predetermined information is continuously supplied for a predetermined time period.

2. An apparatus having a control information output unit according to claim 1, wherein said apparatus has a plurality of protection means.

3. An apparatus having a control information output unit according to claim 1, wherein said apparatus comprises a disk drive, the plurality of kinds of controls including at least a control which determines whether or not a ready signal indicating each part of the disk drive is in a ready state for the operation of the disk drive is outputted.

4. An apparatus according to claim 1, wherein the plurality of kinds of controls include at least a control which adjusts a level of a signal outputted to the external computer.

5. An apparatus according to claim 1, wherein said apparatus comprises a disk drive including a head for recording information on a disk with a plurality of tracks thereon and/or reproducing information therefrom, the disk being insertable into the disk drive and ejectable therefrom, and the plurality of kinds of controls including a control which indicates whether or not the head is initially moved to a predetermined track on the disk after power is supplied to the disk drive.

6. An apparatus having a control information output unit according to claim 5, wherein said first information consists essentially of second information used to perform operations of said controlled objects which are to be controlled by the control information, the information used to select a predetermined kind of control, and third information indicating data not used to perform operations of said controlled objects.

7. An apparatus having a control information output unit according to claim 1, wherein the memory comprises an electrically erasable programmable read only memory.

8. An apparatus having a control information output unit according to claim 1, wherein said connection member comprises a standard interface of a disk drive.

9. An apparatus according to claim 1, wherein said protection means comprises a retriggerable monostable multivibrator coupled to said connection member.

10. An apparatus according to claim 1, wherein said apparatus having a control information output unit comprises a disk drive comprising:
a head for recording information on a disk with a plurality of tracks thereon and/or reproducing information therefrom, the disk being insertable into the disk drive and ejectable therefrom; and
rotation means for rotating the disk inserted the disk drive, and
wherein said plurality of controlled objects comprises:
moving means for moving the head on the disk so as to record the information thereon and/or reproduce the information therefrom;
rotation control means for controlling the rotating of the rotating means; and
read/write means for supplying the information to be recorded to the head and/or for receiving the information reproduced by the head, and
wherein said control means controls the moving means, the rotation control means, and the read/write means, said control means and said memory being integrated into one control circuit.

11. An apparatus according to claim 1, wherein said apparatus having a control information output unit comprises a disk drive comprising:
a head for recording information on a disk with a plurality of tracks thereon and/or reproducing information therefrom, the disk being insertable into the disk drive and ejectable therefrom; and
rotation means for rotating the disk inserted the disk drive, and
wherein said plurality of controlled objects comprises:
moving means for moving the head on the disk so as to record the information thereon and/or reproduce the information therefrom;
rotation control means for controlling the rotating of the rotating means;
read/write means for supplying the information to be recorded to the head and/or for receiving the information reproduced by the head, and
wherein said control means controls the moving means, the rotation control means, and the read/write means, said control means and said memory being integrated into one control circuit.

12. An apparatus according to claim 11, wherein the disk drive further comprises:
first detection means for detecting the presence of the disk;
second detection means for detecting an initial track on which the information is to be recorded and/or from which the information is to be reproduced;
third detection means for detecting a starting position in the initial track on which the information is to be recorded and/or from which the information is to be reproduced;
fourth detection means for detecting whether or not the information can be written on the disk; first, second, third, and fourth detection control means for controlling the operation of the first, second, third, and fourth detecting means, respectively; and a control substrate with a surface having an area of 8 mm * 6 mm and less, on which surface the control circuit and said connection member are mounted, and wherein the first, second, and third detection control means, the moving means, the read/write means, the rotation control means are respectively integrated so as to be mounted on the surface of the control substrate.

* * * * *